E. P. NICHOLS.
EVENING AND GRADING MACHINE.
APPLICATION FILED APR. 27, 1905.
1,046,213.
Patented Dec. 3, 1912.
5 SHEETS—SHEET 1.
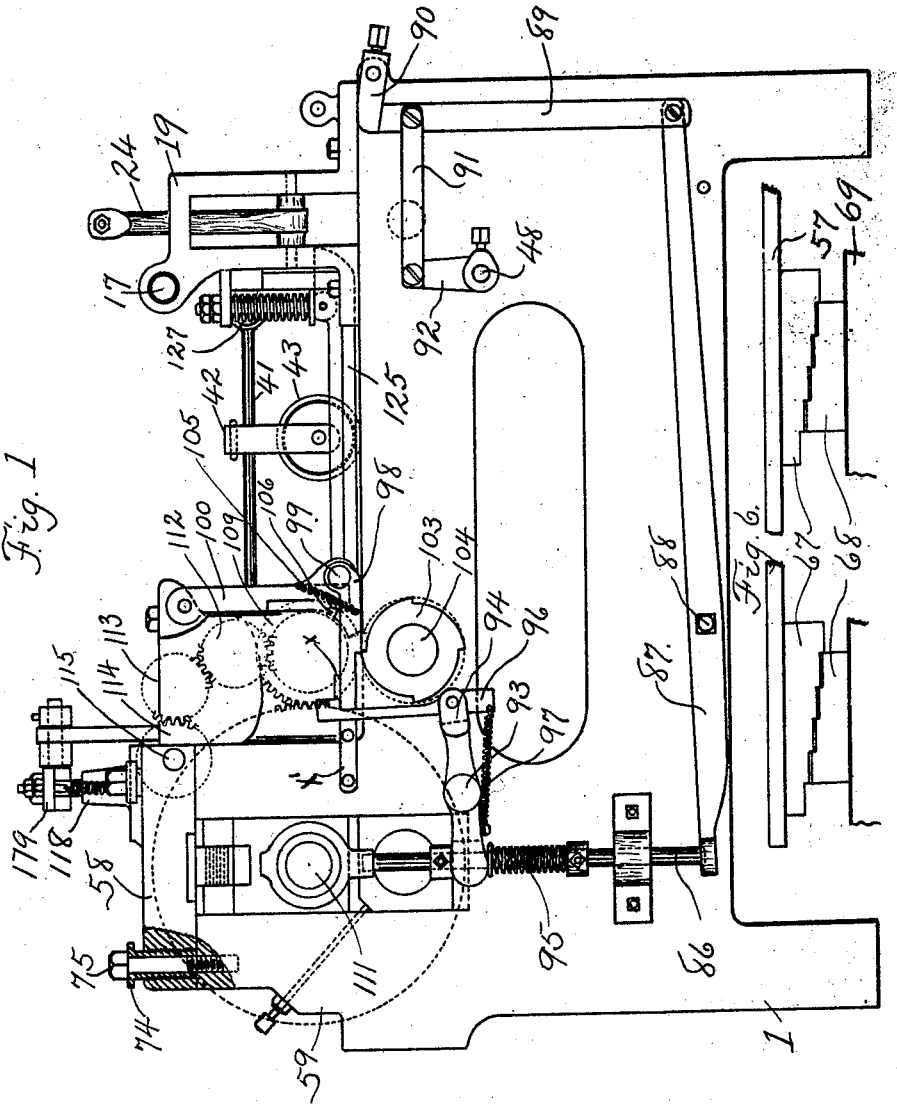
Witnesses.
Asa W. Richardson
Leander A. Cogswell
Inventor.
Elmer P. Nichols.
by Geo. S. Maxwell
Attorney.

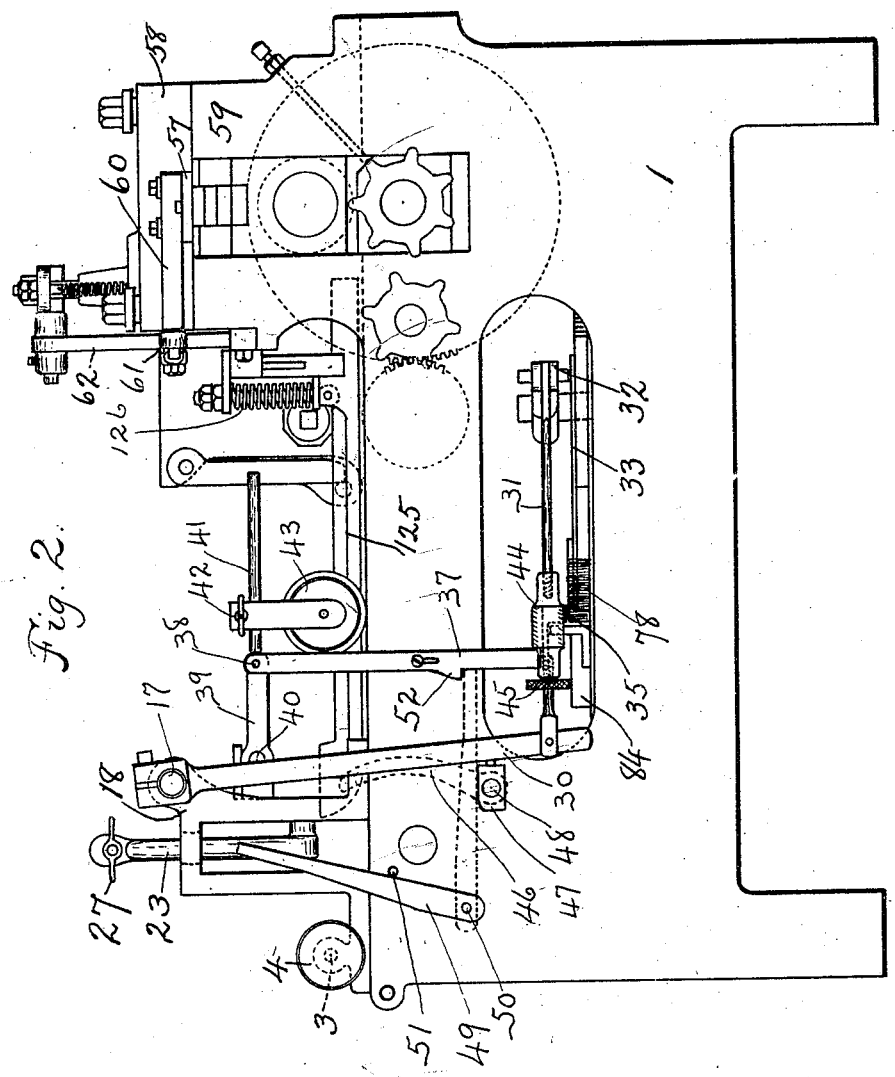

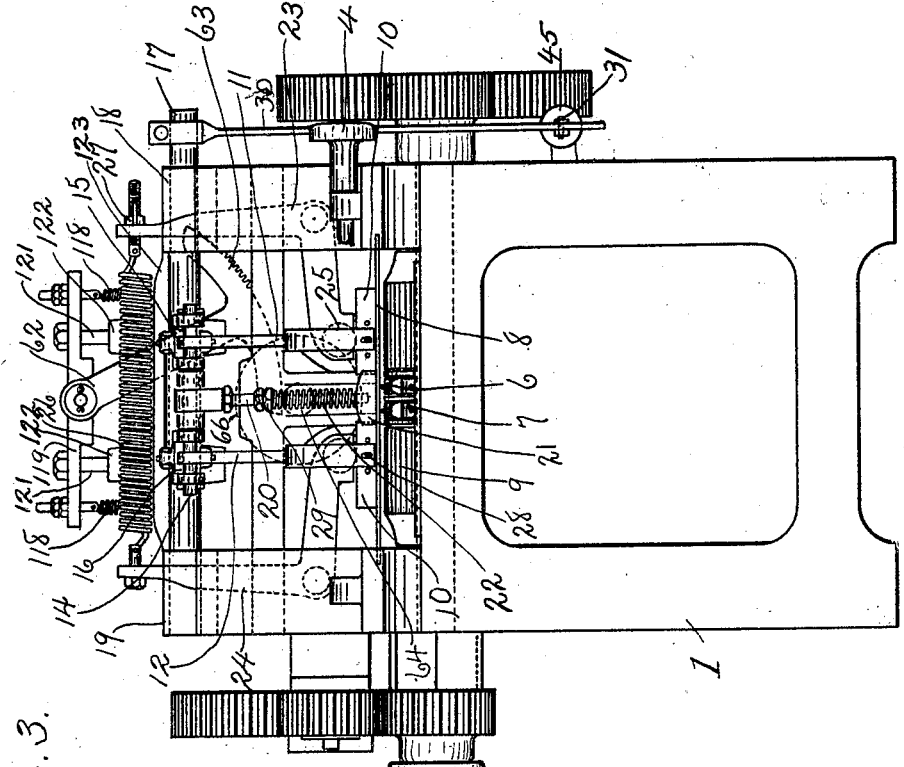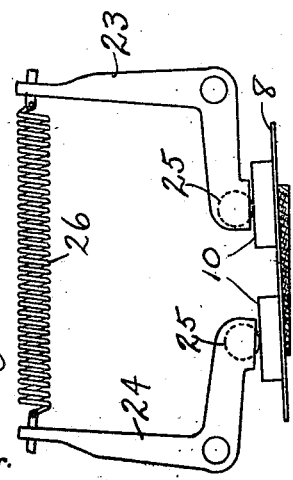

E. P. NICHOLS.
EVENING AND GRADING MACHINE.
APPLICATION FILED APR. 27, 1905.
1,046,213.
Patented Dec. 3, 1912.
5 SHEETS—SHEET 4.
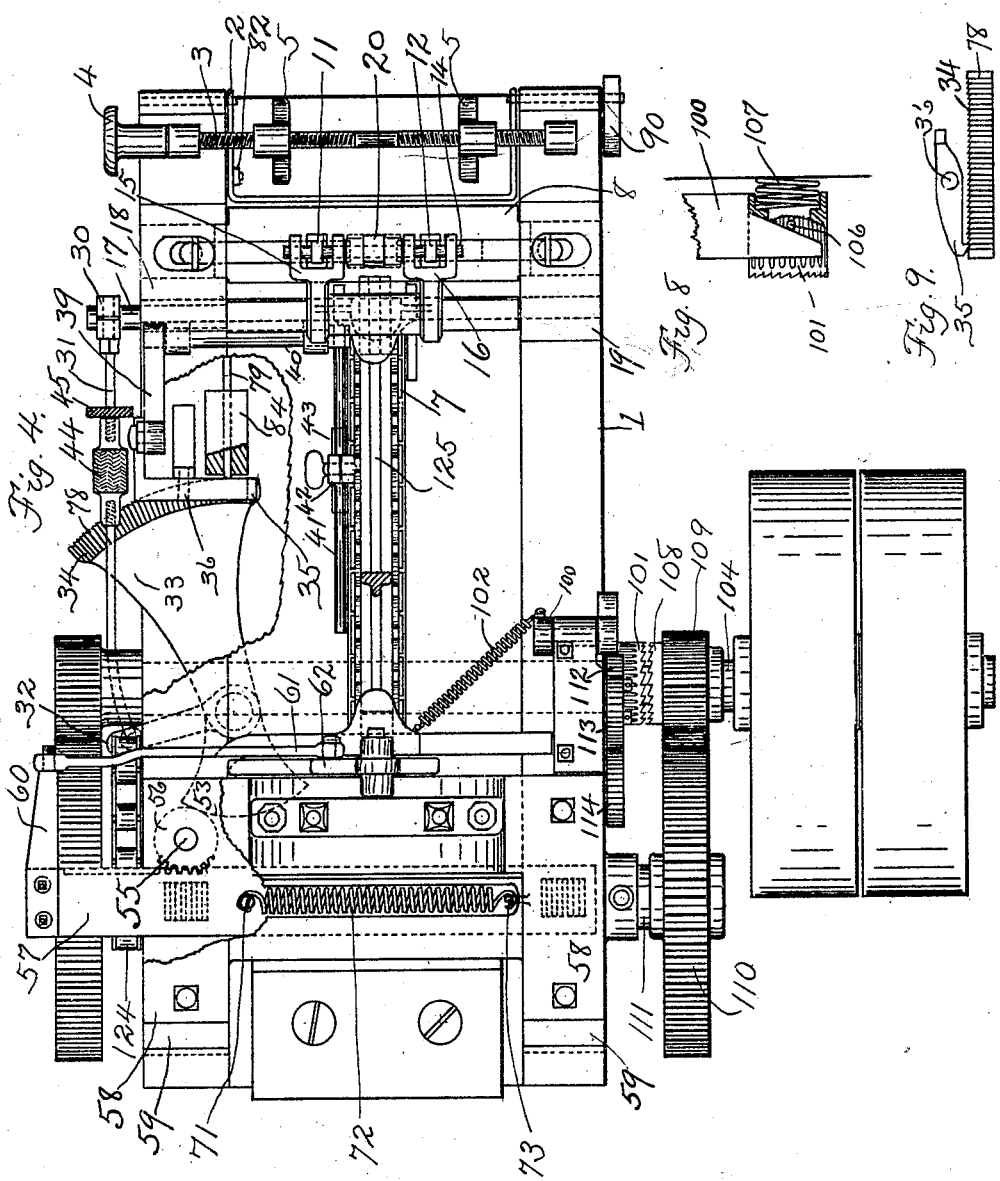
Witnesses.
Asa W. Richardson
Leander A. Cogswell
Inventor.
Elmer P. Nichols.
by Geo. S. Maxwell
Attorney.

E. P. NICHOLS.
EVENING AND GRADING MACHINE.
APPLICATION FILED APR. 27, 1905.
1,046,213.
Patented Dec. 3, 1912.
5 SHEETS—SHEET 5.
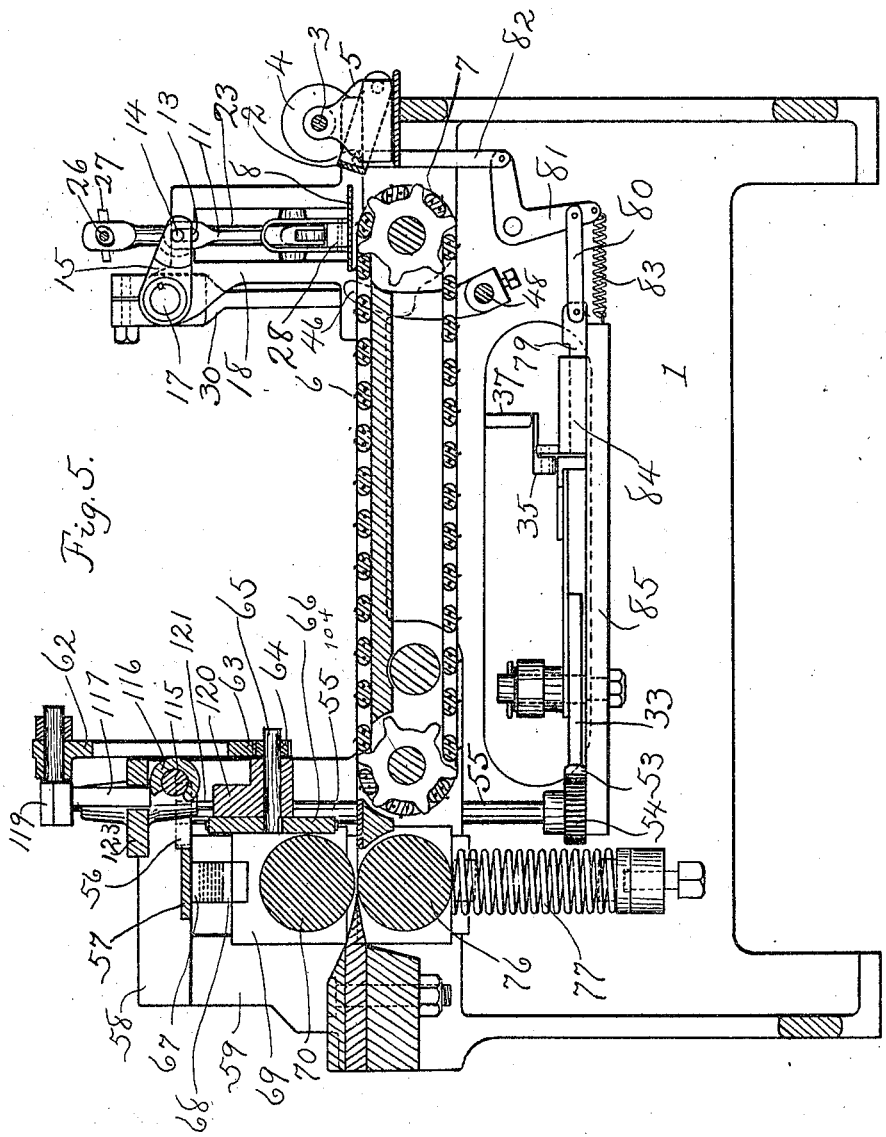

UNITED STATES PATENT OFFICE.

ELMER P. NICHOLS, OF MANCHESTER, NEW HAMPSHIRE, ASSIGNOR TO LACENE MANUFACTURING COMPANY, OF MANCHESTER, NEW HAMPSHIRE, A CORPORATION OF MAINE.

EVENING AND GRADING MACHINE.

1,046,213.     Specification of Letters Patent.     Patented Dec. 3, 1912.

Application filed April 27, 1905. Serial No. 257,587.

*To all whom it may concern:*

Be it known that I, ELMER P. NICHOLS, a citizen of the United States, residing at Manchester, in the county of Hillsboro and State of New Hampshire, have invented an Improvement in Evening and Grading Machines, of which the following description, in connection with the accompanying drawings, is a specification, like letters on the drawings representing like parts.

My invention is a machine for evening and grading leather, and consists of improvements along the line of work originally set forth in my patents of November 22, 1904, Re. No. 12,288 and of January 22, 1907, No. 841,809.

My present aim is to provide means for finer, more accurate and sensitive work than in my previous machines (as disclosed in the aforesaid patent and in my succeeding applications), and includes mechanism for especially adapting my invention to evening and grading counters and taps or half-soles.

Aside from the general principles of operation, I provide a feeling mechanism which is exceedingly sensitive to the edge-thicknesses of the soles, taps, counters and the like and which affords more positive action than heretofore in detecting thin places. The means which I prefer to employ for this purpose consists of a flexible plate capable of bending upwardly or downwardly at either or both ends; and in connection with this plate I provide certain compensating mechanism for giving positive detecting action with a lighter spring than formerly for preventing the liability of compressing the stock, especially at the edges.

A further feature which is especially adapted for taps resides in means for bringing the evening and grade-setting mechanism or feeler device into active operation immediately, the instant the stock is in measurable position. Also the present machine embodies a strong, positive feed adapted to feed very thin and soft stock with the same facility as less pliable and less yielding stock.

I provide positive unyielding means for transmitting the detected measurements from the feelers to the marking and evening devices at the opposite end of the machine, thereby avoiding the possibility of error resulting from a link, strap or similar transmission device as heretofore employed.

Another important feature of my invention resides in the automatic adjustment of the evening mechanism, whereby all possibility of uncertainty, due to slip or spring or yield of parts, is eliminated, which has been liable heretofore to occur when the machine was run at maximum speed. Preferably this feature includes opposite stepped-inclined or adjusting wedges or cams located preferably at the upper side of the movable roll or controlling device which coöperates with the skiving knife; and in connection with these inclines I prefer to employ a heavy adjustable head and also a sensitive trip capable of operating the marking device for very thin stock such as counters and innersoles.

Again, I have devised mechanism whereby the more delicate parts of the mechanism are housed within the frame out of possible contact with all outside objects.

The machine is provided with guiding or centering means for directing the stock properly at its entrance to the machine, besides various other features of invention, all of which will be pointed out more fully in the course of the following description, reference being had to the accompanying drawings in which I have shown a preferred embodiment of my invention.

In the drawings, Figure 1 is a left-hand, side elevation of the machine; Fig. 2 shows the machine in right-hand, side elevation; Fig. 3 is a front end view thereof; Fig. 4 is a top plan view; Fig. 5 is a central, vertical, longitudinal section, parts being omitted for clearness; Fig. 6 is a slightly enlarged side elevation of the adjusting wedges and adjacent parts; Fig. 7 is a view illustrating the operation of the feeler or detecting mechanism at the front of the machine; Fig. 8 is a detail, in front elevation, of a portion of the clutch mechanism or tripping device for the grade marker; and Fig. 9 is a detail of a portion of the grade-setting and locking mechanism.

The machine operates on the same general plan as is more fully set forth in my beforementioned patent, and, therefore, I will confine myself herein, more directly to the constructional details thereof.

My object is, as before, to classify the leather pieces automatically in response to the determinations of the feeler means, and accordingly these determinations are translimited to leather-engaging means which acts upon the leather-pieces to render the grade subsequently recognizable in some definite way.

Viewing more particularly Figs. 3, 4 and 5, it will be seen that I have provided in the frame 1, above the gate 2, a guide-carrying rod 3 operated by a hand wheel 4 and provided with right and left threads for moving simultaneously to equi-distant positions from the center of the machine, opposite guides 5 whereby the operator may quickly set the machine for running through any width of stock. This gate rises at the proper time for permitting the feeding in of stock and then falls automatically, as will be presently explained more at length. As the stock is fed in, it strikes the prongs 6 of the feed chain 7 and is carried beneath a feeler plate 8 which, together with its connected mechanism, constitutes one of the main features of my invention. This plate is preferably made of steel and is flexible, as distinguished from block-like and rigid, said flexibility being preferably secured by making the plate thin and resilient, as clearly shown in Figs. 3 and 5, whereby, as the stock is raised against said plate by the feed chain 7 and the feed roll 9, said plate will yield to the variations of thickness, as clearly shown in Fig. 7. On its upper side the plate 8 is provided with opposite blocks 10 engaged by vertical feelers or feeler-posts or detectors 11, 12, slotted at their upper ends 13, see Fig. 5, for engaging a transverse pin or rod 14 mounted in opposite arms 15, 16, fast on a rock shaft 17 journaled in opposite standards 18, 19 of the frame. The slots 13 are provided for permitting one post to remain up while the other post is pulling downwardly and operating said rock shaft when feeling a thin spot along the adjacent edge of the leather whose condition is being detected and determined. On the rod 14, between the arms 15, 16, is pivoted a rod 20 extending loosely into a block 21 which in turn sets loosely on the middle of the plate 8 and supports a spring 22 on said rod. In the opposite standards 18 and 19 are pivotally mounted opposite bell-crank levers 23, 24 whose lower arms carry rollers 25 freely engaging the upper ends of the blocks 10 respectively, their upper arms being connected to a spring 26 adjustable by a thumb nut 27 for regulating the tension of said bell-cranks or elbow-levers and constituting an equalizer for applying balanced pressure upon the opposite edges of the work being detected. This spring 26 and the connected mechanism affords a very advantageous operation, inasmuch as it not only brings the desired pressure upon the leather at the edges thereof, but, as either of the elbow levers is raised by a thick portion, the increase of tension caused thereby operates to compensate for the downward movement of the opposite lever as the latter seeks a thin place in the opposite edge of the stock. Also as the spring is not restrained excepting by said elbow levers it tends to maintain a uniform tension being free to move bodily to one side or the other as one lever moves up and the other down, and if both levers move up or both move down simultaneously it is evident that the pressure still remains uniform for both levers, whereas when separate springs are used for controlling the opposite ends of the plate 8, as in my patent before-mentioned, or when a positively fixed or controlled spring is used, there is not only an undue pressure, but the pressure is unequal at the opposite ends of the plate. My present construction, however, insures the proper action with a minimum pressure on the stock, the spring 26 being relatively light inasmuch as all its tension is constantly rendered effective and uniformly so at the points required and not elsewhere.

In its broader aspect, this part of my invention consists of delicate and uniform-pressure transmitting feeler means for detecting thin spots in the leather without pressure-distortion, combined with means for conveying the result to the result-indicating means of whatever sort.

For different widths of stock I adjust the posts 11, 12 on the blocks 10 by any convenient means as by a pin and slot adjustment 28, which is herein claimed, but the provision of a member extending across the leather piece from side to side thereof and provided with opposite means engaging said member for transmitting the movements thereof to the grading mechanism is not herein claimed broadly, as it forms part of the subject matter of my copending application Serial No. 219,755, filed August 6, 1904, since become Patent No. 1,009,988, as does also the provision of a positively controlled gate, broadly considered.

The tension of the spring 22 is controlled by a nut 29 for controlling the flexibility of the plate 8 and also giving quick responsiveness to the detector-transmitting mechanism as will be more fully explained later. The stronger the tension of the spring 22, the less can the plate 8 bend upwardly in the middle and hence the greater is its tendency to remain rigid, thereby readily accommodating the machine to narrow stock, such as counters and unusually soft stock such as is occasionally found in soles.

At the outer end of the rock shaft 17 is a crank 30 connected by a link 31 to an arm 32 of a pivotally mounted sector 33 having teeth 34 for operating with a pawl 35 pivoted at 36 and operated by a sliding bar 37 pivoted at 38 to an arm 39 projecting from a shaft 40 provided at its opposite end with an arm 41 carrying an adjustable slide 42 and roll 43 for engaging the forward end of the stock as it is fed in the machine and thereby determining the given point where the feeling mechanism becomes operative. When the roll 43 is raised by the stock, the pawl 35 is thereby brought into locking engagement with the teeth 34 so as to prevent the sector from swinging inwardly Fig. 4, or toward the left Fig. 3, while still permitting it to swing freely in an opposite direction as required for successively thinner spots in the leather as detected by the feeler mechanism. For delicately adjusting this mechanism I provide a right and left threaded adjusting nut 44 and a set nut 45 on the link 31.

For rendering my machine more quickly responsive so as to adapt it to very short stock such as taps or counters, or to even and grade the entire length of other stock, I provide fingers 46, see Figs. 2 and 5, in the path of the stock immediately back of the feeler plate 8 and provided with a short crank 47 on the end of its shaft 48 for lifting a lever 49 pivoted at 50 on the frame of the machine, and shown in Fig. 2 as held in inoperative position by a pin 51 but adapted to be thrown down to its dotted line position for engaging a lifting projection 52 on the lever 37, thereby operating the pawl 35 as before explained. The sector 33 is pivotally mounted concentrically of its end 53 which has toothed engagement with a pinion 54 on the lower end of the shaft 55 which carries at its upper end a similar pinion 56 engaging a rack bar 57 slidingly mounted in a heavy head 58, see Figs. 1, 2, 5, on the rear standards 59 of the machine which carry the grade marking and evening devices which are to be set in accordance with the determinations of the feeler or detecting mechanism at the front of the machine. At its outer end the rack bar 57 has a rigid arm 60 pivotally connected by a rigid rod 61 to a T-shaped arm 62 whose segmental rack 63 engages a pinion 64 fast on a stub shaft 65 whose opposite end carries the marking wheel or die 66 which otherwise operates the same as in my patent before-mentioned. The grade-marking feature of the invention is not herein claimed *per se*, having been separated out for a divisional patent.

As shown most clearly in Fig. 6, it will be seen that the rack bar 57 carries a pair of inclines 67 coöperating with an opposite pair of notched cams (by which I mean devices having stop surfaces at successively varying distances or positions definitely separated or delimited from each other, as distinguished from the smooth or regular cam surface of the stop-means shown and claimed in my Patents 841,809 and 1,009,988 above, in which the graduations of the cam surfaces merge smoothly from one to the next, producing a smooth wedging surface) said notched cams being preferably in the form of stepped inclines or wedges 68 mounted respectively on the upper sides of the journal boxes 69 of the gage-roll or pressure device 70 and acting as stop-means for positively limiting the upward movement of said pressure device 70. The rack bar 57 is connected at 71 with a spring 72 secured at 73 to the head 58, whereby said rack bar and all the connected mechanism extending therefrom to the feeling mechanism are held constantly in one and the same relation, thereby preventing any possibility of back play, lost motion, etc. Extreme precision and accuracy of grading are accomplished by combining this feature with that other feature of my invention whereby the grading mechanism is adjusted at once to each successive increment of thinness-measurement as it is determined by the feeler mechanism (which latter feature, however, is not herein claimed, as it forms a part of the subject matter of my copending application 219,755 now Patent 1,009,988 above). Said inclines or wedges are stepped or provided with a series of successive parallel plane surfaces or impact surfaces very short and fine, (herein shown exaggerated, being actually 1/96th of an inch in height) so that in whatever position they may be adjusted the vertical movement of the gage-roll 70 as it is lifted by the passing stock will cause one series of flat surfaces to engage the opposite series of flat surfaces perpendicular to their planes, thereby preventing any possibility of jumping or sliding and shifting on each other. These machines are run at a high speed and are required to be extremely accurate, grading and evening the leather with absolute accuracy, and as the front end of a sole, for instance, is brought by the feed chain suddenly beneath the gage-roll 70 the latter is jumped upward forcibly with such suddenness and momentum as to require an absolutely unyielding and positive stop.

By providing the stepped construction above explained, there is no tendency to shift or yield laterally, as would be the case if one wedge-surface met another wedge-surface along inclined planes or even one wedge surface against another surface, whether wedge shaped or not, as in the graduated cams or stop-means of my last mentioned patents. Moreover, by having the adjusting mechanism on top of the journal boxes, as distinguished from being connected by rods to supports beneath the machine, there is no possibility of give or spring, but the gage-roll 70 is stopped positively and definitely at a given point according to the adjustment of the wedges. The head 58 is very heavy and is adjustably mounted at its four corners by any suitable means, a heavy hollow screw 74 being shown as screwing into said head and containing a screw 75 threaded into the standard 59. This provision enables the user of the machine to obtain just such relative adjustment between the grading and the evening as he may desire. For example, in one factory they may desire to have the evening light with reference to the grade marks, whereas in another factory they may desire to have slightly more leather than the grade marks would indicate. The notched or stepped cam stop or wedge 68 is arranged to be adjusted with relation to the part engaged thereby when said parts are out of sliding contact with each other (as distinguished for instance from the sliding adjustment of my last mentioned patent), but this feature, considered broadly, is not herein claimed, as it forms part of the subject matter of my application 219,755 now Patent 1,009,988 above. The lower roll 76 is yieldingly supported by springs 77 in the same manner as shown in my said patent.

The evening means or mechanism may be defined as consisting of cutting means and coöperating means to control the position of the leather while being cut, so that the leather will be properly cut level or even, i. e., evened to exactly the required extent. In the preferred mechanism herein shown, the cutting means is an ordinary skiving knife, and the coöperating means which controls the position of the leather while being cut includes the cam stops or stepped inclines, and the pressure roll or gage device interposed between said stops and the top surface of the leather. This is the preferred construction, but I wish it understood that, unless otherwise restricted in the claims, I am not limited thereto, as the evening mechanism (which is one form of the stock grading mechanism herein provided, the other form being the marking mechanism) is intended broadly to include any and all forms of mechanism capable of bringing uneven leather down to an even condition. The definitely limiting holding mechanism for maintaining the leather at an unchangeable distance from the knife while being cut, is made adjustable to respond to the feeler mechanism and thereby carry out the main purpose of my machine, and I prefer the stepped wedges for securing certainty as well as precision of action; I prefer that the stock shall not be compelled to slide directly in contact with the stops or adjustable wedge members but shall be engaged by a roll, as this gives better results, and I prefer that this roll shall be positively driven so as to offer as little resistance as possible to the passage of the stock, and I prefer that this roll shall be freely movable, except as stopped by the graduated cam stops or wedges, as thereby it maintains a more uniform pressure or weight on the leather and its vertical movement is availed of to operate the feed-controlling gate and to trip the marking mechanism, being functions outside of or in addition to its function as a preferred portion of the evening mechanism. Said knife, roll and stop which thus constitute the evening mechanism, in the present preferred embodiment thereof, coöperate to even the leather in response to and in accordance with the feeler mechanism, by which they are directly influenced or affected so as automatically to grade with reference to said feeler mechanism.

As the stock is fed through the machine and escapes from the gate 2 the gate drops, thereby locking the segment 33 by the engagement with its edge-teeth 78 of a detent 79 connected by a link 80, see Fig. 5, to a bell-crank 81 connected by a link 82 to said gate. If for any reason the feeler plate 8 should rise after the gaging mechanism is locked, this rising or independent adjustment is permitted by the spring 22 and the slots 13 without affecting either the gaging mechanism or grading mechanism. To aid the gate in closing I provide a spring 83 connected to said bell-crank. The detent 79 slides in a block 84 mounted on a ledge 85 of the frame which supports the sector and adjacent mechanism.

As soon as the stock has passed entirely through the machine, the gage-roll drops and thereby opens the gate, being provided for this purpose with a plunger 86 operating a lever 87 pivoted at 88 and provided with a bar 89 at its opposite end normally resting beneath the crank 90 for operating said gate, see Figs. 1 and 4. Said bar 89 is also connected by a link 91 to a crank 92 on the shaft 48 operated by the fingers 46, so that as soon as the forward end of the stock has passed the feeler plate said fingers thereupon remove the supporting bar 89 from beneath the crank 90 connected with the gate and leave the latter in condition to drop whenever the stock has escaped therefrom.

For giving extreme delicacy of operation to the tripping mechanism for branding or stamping the grade marks upon the leather and enabling the machine to respond with certainty to thin pieces of leather, I provide special mechanism operated by the lifting of the pressure roll 70 by the entrance beneath said roll of the front end of the stock. I prefer this construction for several reasons, first, because it causes the marking device to act when the work has arrived at exactly the right position, and, secondly, because it is not dependent in any way upon the stiffness of the stock nor upon the thickness of the stock, as the pressure roll is necessarily obliged to rise in order to permit any stock whatever, whether thick or thin, flexible or rigid, soft or hard, to pass beneath it. Pivoted at 93 on the frame of the machine is a lever 94 held in yielding engagement with the rod 86 by a spring 95, and carrying a hook-shaped detent 96 at its opposite end normally held forward by a spring 97 in position to engage a dog 98 pivotally carried at 99 by a cam plate 100 which is free to swing toward and from a clutch 101, see Figs. 4 and 8, being normally held inward by a spring 102. Certain features relating to this clutch, herein shown but not claimed, are duly claimed in my copending application Serial No. 219,755, now Patent 1,009,988. The dog 98 is normally in position to almost but not quite engage a shouldered collar 103 fast on the main shaft 104 and is caused to engage by the upward movement of the roll 70, rod 86 and spring 95 which act to lower the detent 96 and dog 98. The instant the shouldered dog 98 is lowered from the position shown in Fig. 1 it is struck by the next following shoulder of the collar 103 which rotates with the drive shaft 104 and instantly shifted to the right Fig. 1 so as to disengage or release the clutch member 101. The spring 95 is provided to accommodate varying thicknesses of stock. When thus engaged and swung by the rotation of the collar and shaft backwardly toward the right Fig. 1, the dog 98 is held by a spring 105, up against an overhanging stop $x$ of a fixed guide bar $x^1$ so that thereafter it cannot accidentally drop against the shoulder of the collar again, the cam plate 100 having meanwhile released the pin 106 of the clutch 101 permitting the latter to be moved instantly forward by its spring 107 to engage the complemental teeth 108 on the hub of a pinion 109 loose on a stub shaft just above said main shaft 104 and geared to the latter by said pinion 109 which also drives a gear 110 on the shaft 111 of the gage-roll 70. The clutch 101 is provided with teeth in mesh with idlers 112, 113 for driving a gear 114 on a shaft 115 provided with a cam 116 for lifting a plunger 117 and permitting the same to fall under the action of springs 118, said plunger being carried by a cross-bar 119 which carries the marking wheel 66 and operating mechanism. Said marking wheel is journaled in a hanger 120 supported on rods 121 depending from the cross-bar 119 and sliding in guide ways 122 in a fixed bridge 123.

The feeding mechanism is operated by a sprocket chain 124. Above the feed chain 7 I provide a special shoe or presser plate 125, or coöperating with said feed chain in giving a strong positive feed for all kinds of stock alike, said shoe or presser plate being heavy and rigid and extending directly in line with and above the teeth or prongs 6 of the feed chain for impaling the leather on said teeth irrespective of the tendency of said leather to bend. I have before provided pressers at the opposite sides of the chain, the result being that very flexible and spongy stock would bend at the edges beneath said pressers and arch more or less out of contact with the impaling prongs. The presser plate 125 is held down yieldingly by springs 126, 127.

The operation of the foregoing machine is as follows: If the operator has been running through number 11 or 12 soles, for instance, and next has a job of number 5 soles, he adjusts the guides 5 correspondingly by means of the hand wheel 4 so as properly to center the stock, and then, the gate 2 being already held in raised position by the bar 89 and connected mechanism extending back to the gage-roll 70, the leather piece is shoved against the feed prongs and quickly lifted into contact with the feeler plate 8 (claimed broadly in my Patent 1,009,988) which is immediately lifted by the leather piece as the latter is fed inward by the feed chain, said plate yielding to the unevenness of the stock as the latter passes along. As soon as the front end of the stock reaches the back edge of the feeler plate, it strikes the adjacent fingers 46 which operate to release the gate, and also, (in case the piece of stock is a small piece, as a counter or tap, or in case it is intended to even and grade the stock for its entire length), the operation of said fingers in such case serves to throw the detent 35 into engagement with the sector 33 of the setting mechanism. As the leather passes along beneath the feeler plate, the latter bends and yields upwardly and downwardly following along the edges of the leather piece under the pressure of the elbow levers 23, 24 actuated by the equalizing spring 26, and as one post 11 or 12, as the case may be, is depressed lower than the other, it correspondingly rocks the shaft 17 and through the connections 30, 31 and 32 moves the forward end of the sector 33 outward to the right, each successive increment of downward movement of either of the posts 11, 12 being deftly and accurately retained by said sector which is engaged, as stated, by its pawl 35 for the purpose. The edge-engagement or grading with reference to a plurality of edge detections, following the variations of edge contour, is not herein claimed, as it is broadly claimed in my copending application, now Patent No. 841,809. If counters or the like are being evened or graded, the spring 22 is given a corresponding tension, so as to require the plate 8 to assume a more nearly rigid condition. Said spring 22 also performs another useful office. It operates, upon the entrance of stock, to compel the quick action of the rock shaft 17 and all its connected parts back to the wedge-carrying bar 57. The spring 22 presses unremittingly upward upon rod 14 and hence always causes the train of parts 15, 16, 17, 30–33, 54, 56, 57–67 to be pulled forward. As this pulling strain is constant, pulling forward at one end of said train of parts, while the spring 72 exerts at the opposite end of said train of parts a rearward pulling strain which is also constant, it follows that no lost motion can take place, and the gaging mechanism must instantly respond to the feeling mechanism with no possibility of uncertainty due to looseness of parts or the like. In case it is not desired to classify the particular work in hand for its entire length, but only with reference to a portion thereof, the lever 49 is thrown up into its full line position Fig. 2 so as to be uninfluenced by the fingers 46 and thereupon the evening and grading movements are not retained until the forward end of the stock strikes the roll 43 according to any given adjustment thereof, and thereupon said roll through its connections 41, 40, 39 and 37 operates the dog 35 the same as before. When the stock has been fully felt of and its desired thinnest portions determined and recorded by said automatic mechanism, the detent 79 immediately locks the sector 33 and retains it and all the connected mechanism back to the gage-roll 70 in immovable position thereafter until the stock has finally passed from the machine, said detent being actuated by the dropping of the gate 2.

The grade marking and leather cutting or evening devices are set by the gradual swinging outward to the right of the sector 33 through the actuation by its opposite end of the parts 54—57, the latter shifting the stepped wedges of the evening mechanism and thereby positively fixing the extent of vertical movement thereafter possible to the gage roll and at the same time through the connections 60—65 rotating the marking wheel 66 accurately to the proper position for marking the leather according to its determined grade.

I am aware that my invention is capable of a wide variety of embodiments within the spirit and scope of the appended claims, taken in connection with the accompanying drawings and description, and accordingly I wish it understood that the present embodiment herein presented is merely a preferred construction, except as otherwise explicitly stated.

The feeler mechanism at the front of the machine constitutes gage adjusters for automatically governing the grading mechanism or mechanism at the rear of the machine for adjusting and controlling the grademarking and the cutting or evening mechanism, while the pawl and ratchet mechanism between the two former constitutes setting mechanism therefor.

For lack of a better generic term to cover the mechanism which is gaged, I call it the leather-engaging means, grade indicating means or grading mechanism, as its primary office is to engage the leather pieces for the purpose of usefully perpetuating the determinations of the feeler means. The leather-engaging means serves to classify the leather either directly or indirectly, by marking it with a readable symbol, altering its thickness, surface or weight to a measurable extent, or in some way bringing in a distinguishing element in connection with the leather piece, whereby the result of the feeler-detecting is made available.

Having described my invention, what I claim as new and desire to secure by Letters Patent, is:

1. In a machine of the kind described, feeler mechanism for detecting thin spots, comprising a flexible plate capable of bending to the unevenness of the piece of leather, and means for maintaining said plate in yielding engagement with the leather, leather engaging mechanism governed by the feeler mechanism for operating on the leather, and mechanism including setting means for transmitting the desired determinations of said feeler mechanism.

2. In a machine of the kind described, a flexible feeler plate, means for supporting the leather to be felt by said flexible plate, means for varying the flexibility of said plate, leather-engaging means, and mechanism responsive to said feeler plate for adjusting said leather-engaging means.

3. In a machine of the kind described, feeler means for engaging a piece of stock at a plurality of places for feeling of the same, means for maintaining without pressure-distortion the same light pressure at said different places irrespective of the varying thicknesses of the stock, leather-engaging means governed by the feeler means, and automatic gaging mechanism for transmitting the determinations of said feeler means.

4. In a machine of the kind described, means for feeling of a piece of stock at a plurality of places, a plurality of transmitting devices for transmitting the thinnest measurement determined by said feeling means, leather-engaging means governed by said devices, and separate pressure-mechanism for maintaining uniform pressure adjacent the opposite edges of the stock being felt of.

5. In a machine of the kind described, feeler mechanism, including means for engaging the stock, opposite pressure-devices, having a counterbalancing spring extending between them and transmitting the movements of one of said devices to the other.

6. In a machine of the kind described, a flexible feeler plate, means for supporting the leather to be felt of by said flexible plate, leather-engaging mechanism, means for transmitting the determinations of said feeler plate to said leather-engaging mechanism, and pressure means separate from said transmitting means for applying uniform pressure adjacent the opposite ends of said feeler plate.

7. In a machine of the kind described, feeler mechanism for feeling of a piece of stock, gaging mechanism operated by said feeler mechanism, and setting means actuated by said stock for causing said gaging mechanism to be set with relation to the thin portions of said piece from the extreme front end of the stock.

8. In a machine of the kind described, mechanism for adapting the machine to taps and short pieces of stock, comprising the combination of feeler mechanism for feeling of a piece of stock, leather-engaging means for operating on the stock, gaging mechanism therefor, setting mechanism for controlling said gaging mechanism, and means, capable of operating throughout the entire length of the stock, for rendering and maintaining said setting mechanism responsive to all the feeler movements for the entire length of stock.

9. In a machine of the kind described, feeler mechanism for feling of a piece of stock, gaging mechanism operated by said feeler mechanism, and setting means actuated by said stock for setting said gaging mechanism, said setting means including a trip, and two devices, one of said devices being arranged to operate the trip after the front end of the piece of stock has passed some distance beyond said feeler mechanism, and the other of said devices being arranged to operate the trip to cause said gaging mechanism to be set with relation to the thin portions of said piece from the extreme front end of the stock, said latter of said two devices being movable at the will of the operator into inoperative position out of the path of the stock and out of influence on said trip.

10. In a machine of the kind described, adjustable stock grading mechanism to engage one side of the stock, feeler mechanism to detect thin spots in the stock in accordance with which the latter is to be graded, and intervening gaging means for transmitting to said engaging means the determinations of said feeler mechanism, including means constructed and arranged to prevent lost motion in said transmission.

11. In a machine of the kind described, adjustable stock grading mechanism to engage one side of the stock, feeler mechanism to detect thin spots in the stock in accordance with which the latter is to be graded, including an adjustable member extending across the piece of stock from side to side thereof, adjusted by engagement with the stock, and connecting means for setting said grading mechanism in response to the adjustment of said adjustable member, having lost-motion-preventing structural components for preventing lost motion in said connections when setting the grading mechanism.

12. In a machine of the kind described, the combination with an evening cutter, of a movable gage roll, an adjustable stop for limiting the movement of said gage roll, feeler mechanism to detect thin spots in accordance with which said stop is to be set, and connections for setting said stop in accordance with the determinations of said feeler mechanism, including provision for transmitting said setting movement without lost-motion variation.

13. In a machine of the kind described, feeler mechanism, grading mechanism, setting mechanism effectively responsive to said feeler mechanism for governing said grading mechanism, and means connecting the feeler and setting mechanisms for positively transmitting without variation each gaging increment of feeler determination to said setting mechanism.

14. In a machine of the kind described, feeler mechanism, evening mechanism, setting mechanism effectively responsive to said feeler mechanism for governing said evening mechanism, and means connecting the feeler and setting mechanisms for positively transmitting without variation each gaging increment of feeler determination to said setting mechanism.

15. In a machine of the kind described, means to operate on a leather piece, comprising adjusting means which includes a notched cam-stop, and means controlled by the leather piece for adjusting said cam-stop.

16. In a machine of the kind described, an evening cutter to grade a leather piece, a movable gage roll, a notched cam-stop for limiting the movement of said gage roll with reference to said cutter, and means controlled by the leather piece for adjusting said cam-stop.

17. In a machine of the kind described, an evening cutter to grade a leather piece, a movable gage roll, a notched cam-stop for limiting the movement of said gage roll with reference to said cutter, means controlled by the leather piece for adjusting said cam-stop, and means movable with said gage roll adapted to interlock with said notched cam-stop when said roll is engaged by said piece to be cut.

18. In a machine of the kind described, the combination with an evening cutter, of a movable gage roll adapted to be moved by the engagement therewith of the leather piece to be evened, and adjusting means for regulating the movement of said gage roll, including a stationary part and a longitudinally movable wedge-shaped cam-stop adjustable into position between said stationary part and said gage roll.

19. In a machine of the kind described, the combination with an evening cutter, of a movable gage roll adapted to be moved by the engagement therewith of the leather piece to be evened, and adjusting means for regulating the movement of said gage roll, including a stationary part, longitudinally movable stop-means having two wedge-shaped portions adapted to engage respectively said stationary part adjacent the opposite ends of said gage roll.

20. In a machine of the kind described, the combination with an evening cutter, of a movable gage roll adapted to be moved by the engagement therewith of the leather piece to be evened, and adjusting means for regulating the movement of said gage roll, including a stationary part, and a cam-stop movable approximately parallel to said gage roll having two wedge-shaped portions located respectively adjacent the opposite ends of said roll and adapted to be moved between said ends of the roll and said stationary part for limiting the movement of the roll when engaged by said leather piece.

21. In a machine of the kind described, feeler mechanism, evening mechanism, including a gage device, and means for setting said gage device according to said feeler mechanism, including adjustable means for limiting the movement of said gage device and having an impact surface perpendicular to the direction of movement of said gage device, during all the movements of said gage device.

22. In a machine of the kind described, feeler mechanism, grading mechanism controlled by said feeler mechanism, and setting mechanism responsive to said feeler mechanism for setting said grading mechanism, said grading mechanism including stepped inclines and a gage device constructed to coöperate with said inclines for limiting the vertical movements of said gage device.

23. In a machine of the kind described, a movable gage device provided on its upper side with stepped inclines, adjustable means for limiting the movements thereof provided with stepped inclines arranged opposite to said first-mentioned inclines for coöperating therewith, and automatic mechanism for adjusting said means.

24. In a machine of the kind described, a frame provided with standards having a heavy cross head, a gage device movable in said standards toward and from said cross head, a slide bar and inclines movably mounted in said cross head to regulate said gage device, and means for automatically moving said bar and inclines.

25. In a machine of the kind described, feeler mechanism, a grade marker and evening mechanism responsive to said feeler mechanism, said evening mechanism including a pressure device, an automatically adjustable unyielding plane-faced impact device to limit the movement of said pressure device, and means to vary the relative grading relation of said marker and evening mechanism so that the machine will even flush or meager as desired with relation to the markings.

26. In a machine of the kind described, feeler mechanism, evening mechanism responsive to said feeler mechanism, including a pressure device, a heavy cross head in opposition to said pressure device, and means for adjusting said cross head for producing in the evening a desired variation from the determinations of said feeler mechanism.

27. In a machine of the kind described, yielding feeler mechanism at the front of the machine, leather-engaging means for operating on the stock at the rear of the machine, and feeding mechanism for feeding the stock from said mechanism to said means, including impaling prongs for engaging the stock, and a rigid presser device located directly vertically opposite said impaling prongs for pressing the stock on the latter and holding it in engagement therewith.

28. In a machine of the kind described, yielding feeler mechanism at the front of the machine, means for operating on the stock at the rear of the machine, and feeding mechanism for feeding the stock from said mechanism to said means, including impaling prongs for engaging the stock, and a rigid presser plate extending centrally lengthwise of the machine directly over said impaling prongs for engaging the middle of the stock being operated upon and pressing it down upon said prongs.

29. In a machine of the class described, feeler mechanism including a normally flexible plate for engaging the stock, and means for rendering said plate rigid for operating on narrow stock, combined with leather-engaging apparatus governed by said feeler mechanism for indicating the determinations of the latter.

30. In a machine of the kind described, a feeler plate, yielding means for permitting the opposite ends of said plate to yield independently, means for transmitting the movements of said plate, including a rock shaft, and a spring between said plate and rock shaft normally tending to move said shaft in opposition to said plate.

31. In a machine of the kind described, a feeler plate, grading mechanism controlled thereby, operating connections between said plate and mechanism, yielding means for maintaining said plate in pressing contact with the stock, and mechanism independent of said yielding means for preventing lost motion in said connections and maintaining said connections instantly responsive at all times.

32. In a machine of the kind described, feeler mechanism, including a work member extending transversely of the machine in position to engage the stock from edge to edge of said stock, devices responsive to the movements of said member under the influence of said stock at the opposite edges thereof, said devices being normally fixed but capable of adjustment toward and from each other in accordance with different widths of stock, and adjusting means for fixing said responsive devices in their said different adjustments, transmission mechanism, and stock grading mechanism automatically regulated by said transmission mechanism with relation to said feeler mechanism.

33. In a machine of the kind described, feeler mechanism to detect thin spots in a leather piece, and grading mechanism governed by said feeler mechanism, said feeler mechanism including a member extending across the leather piece from side to side thereof, opposite means engaging said member for transmitting the movements thereof, laterally adjustable on said member for different widths of stock.

34. In a machine of the kind described, feeler mechanism to detect thin spots in a leather piece, and grading mechanism governed by said feeler mechanism, said feeler mechanism including a member extending across the leather piece from side to side thereof, opposite posts standing endwise with relation to said member to transmit the determinations of said member in its engagement with the opposite edges of the leather piece, and means for shifting said posts toward and from each other for maintaining them approximately over the edges of leather pieces of different widths.

35. In a machine of the kind described, feeler mechanism, grading mechanism, feeding mechanism, a gate in front of said feeler mechanism to control the entrance of stock to the machine, said grading mechanism including a vertically movable pressure device beneath which the stock must pass from said feed mechanism, a lever extending lengthwise of the machine, means at one end of said lever connected with said gate and means at the opposite end connected with said pressure device, arranged to open the gate by the fall of the pressure device.

36. In a machine of the kind described, feeler mechanism, grading mechanism, feeding mechanism, a gate in front of said feeler mechanism to control the entrance of stock to the machine, said grading mechanism including a vertically movable pressure device beneath which the stock must pass from said feed mechanism, a lever extending lengthwise of the machine, means at one end of said lever connected with said gate and means at the opposite end connected with said pressure device, arranged to open the gate by the fall of the pressure device, tripping means in the path of the stock close to and immediately in front of the feeler mechanism connected to said gate operating mechanism for automatically permitting it to be closed when stock is fed into the machine.

37. In a machine of the kind described, feeler mechanism, grading mechanism, and means for transmitting to the latter the determinations of the feeler mechanism, including a swinging ratchet member having adjacent its free end radial ratchet teeth and transverse ratchet teeth, means coöperating with said radial teeth to prevent swinging movement in one direction, and means coöperating with the transverse teeth to prevent swinging movement in the opposite direction, one of said means being operated by the feeler mechanism for retaining the determinations thereof, and operating mechanism for said other means to actuate the latter to lock the swinging ratchet against further movement.

38. In a machine of the kind described, feeler mechanism, grading mechanism, and means for transmitting to the latter the determinations of the feeler mechanism, including a swinging ratchet member having adjacent one free end radial ratchet teeth and transverse ratchet teeth, and adjacent its opposite end a segmental rack, a pinion engaged with said rack, means adjusted by said pinion for determining the position of said grading mechanism, means coöperating with said radial teeth to prevent swinging movement in one direction, and means coöperating with the transverse teeth to prevent swinging movement in the opposite direction, one of said means being operated by the feeler mechanism for retaining the determinations thereof, and operating mechanism for said other means to actuate the latter to lock the swinging ratchet against further movement.

39. In a machine of the kind described, feeler mechanism to detect thin spots in a leather piece, feeding mechanism for feeding the leather piece, grading mechanism to engage the leather in accordance with the determinations of the feeler mechanism, gaging mechanism for transmitting to the grading mechanism said determinations, including tripping means in position to be tripped by the leather piece the moment its front end is felt of, other tripping means at a distance, and means for placing either one of said tripping means at the will of the operator in operative relation with the gaging mechanism for operating the latter either with relation to the extreme front end of the stock or to a point back from the front end according to whether one tripping means is being used or the other as the case may be.

40. In a machine of the kind described, the combination of means for receiving a leather piece to be graded, including a member extending across the leather piece from side to side thereof, adjustably and pivotally supported, a cutter, regulating rolls, one of which is also adjustably supported, an adjustable stop, means operatively related to the adjustable regulating roll and adapted to engage the stop, means for adjusting the stop, means operatively related to the adjustable member for operating the stop-adjusting means, and yielding means disposed between the last said means and the stop-adjusting means to permit a further adjustment of the said receiving member when the regulating roll is adjusted.

41. In a machine of the kind described, the combination of receiving members to receive between them a piece of leather to be evened, one of said members being adjustable and extending across the leather piece from side to side thereof, a cutter, regulating rolls, one of which is also adjustable, a notched cam, means operatively related to the last said roll and adapted to coöperate with said notched cam to limit the adjustment of said roll, and means controlled by the adjustment of the adjustable receiving member for moving the cam to coöperate with said coöperating means and permit the regulating roll to be thereby correspondingly adjusted.

42. In a machine of the kind described, the combination of receiving members to receive between them a piece of leather to be evened, one of said members being adjustable and extending across the leather piece from side to side thereof, a cutter, regulating rolls, one of which is also adjustable, bearings located above said rolls, said bearings being provided with an inclined face, a coöperating stop member provided with inclined faces engaging the inclined faces on the bearings, and means operatively related to said adjustable receiving member for positioning said stop member.

In testimony whereof, I have signed my name to this specification, in the presence of two subscribing witnesses.

ELMER P. NICHOLS.

Witnesses:
   GEO. H. MAXWELL,
   M. A. JONES.